Nov. 2, 1943.                L. HENLEY                2,333,175
                         CONTINUOUS COOKER
                        Filed Feb. 24, 1941           5 Sheets-Sheet 1
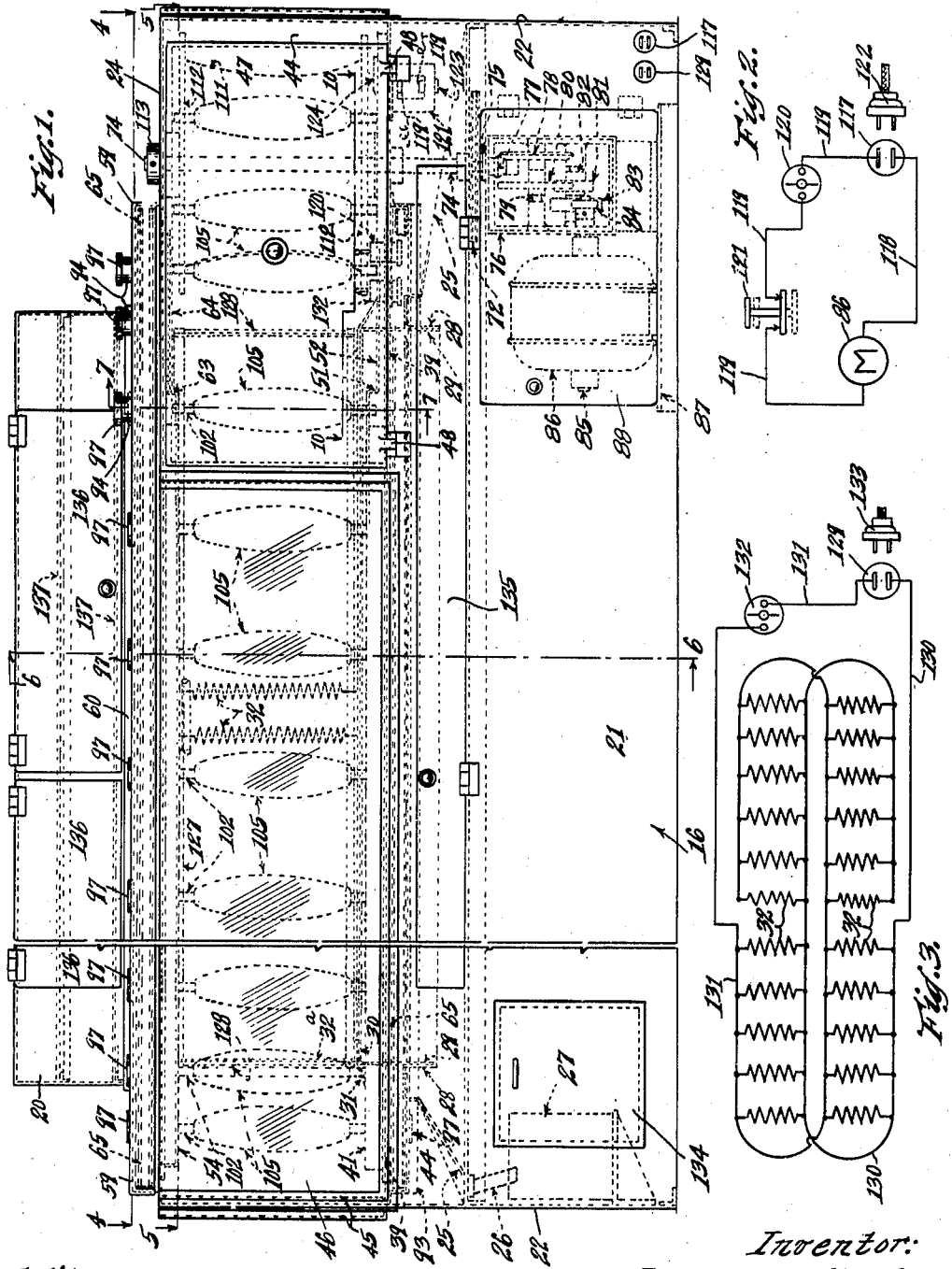
Witnesses:
C. E. Wessels
Aasta E. Matson
Inventor:
Lawrence Henley
By Joshua R. H. Potts
his Attorney.

Nov. 2, 1943.    L. HENLEY    2,333,175
CONTINUOUS COOKER
Filed Feb. 24, 1941    5 Sheets-Sheet 2
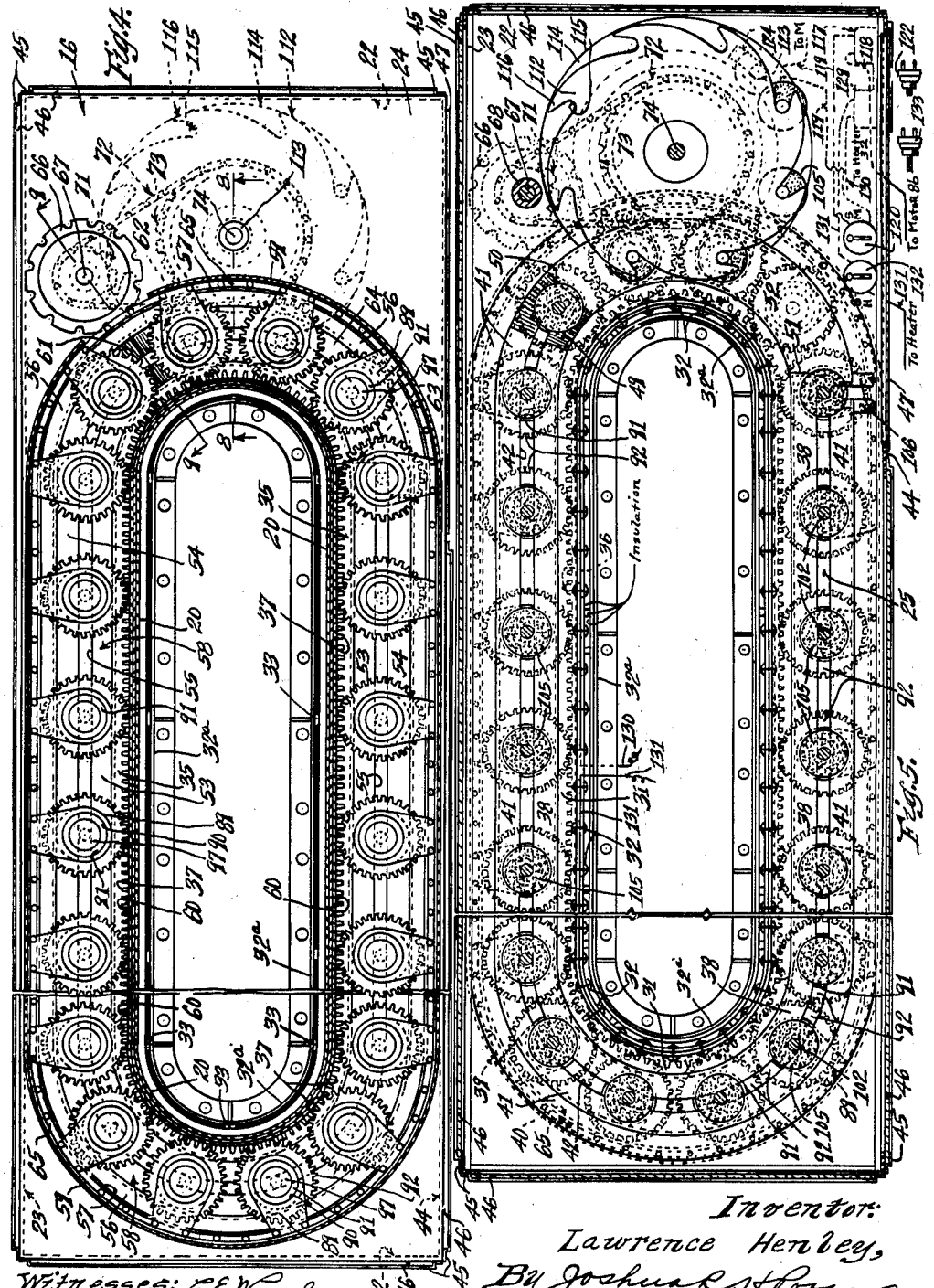
Inventor:
Lawrence Henley,
By Joshua R. H. Potts
his Attorney.
Witnesses: C. E. Wessels
Aasta E. Matsen Nov. 2, 1943.　　　　L. HENLEY　　　　2,333,175
CONTINUOUS COOKER
Filed Feb. 24, 1941　　　5 Sheets-Sheet 4
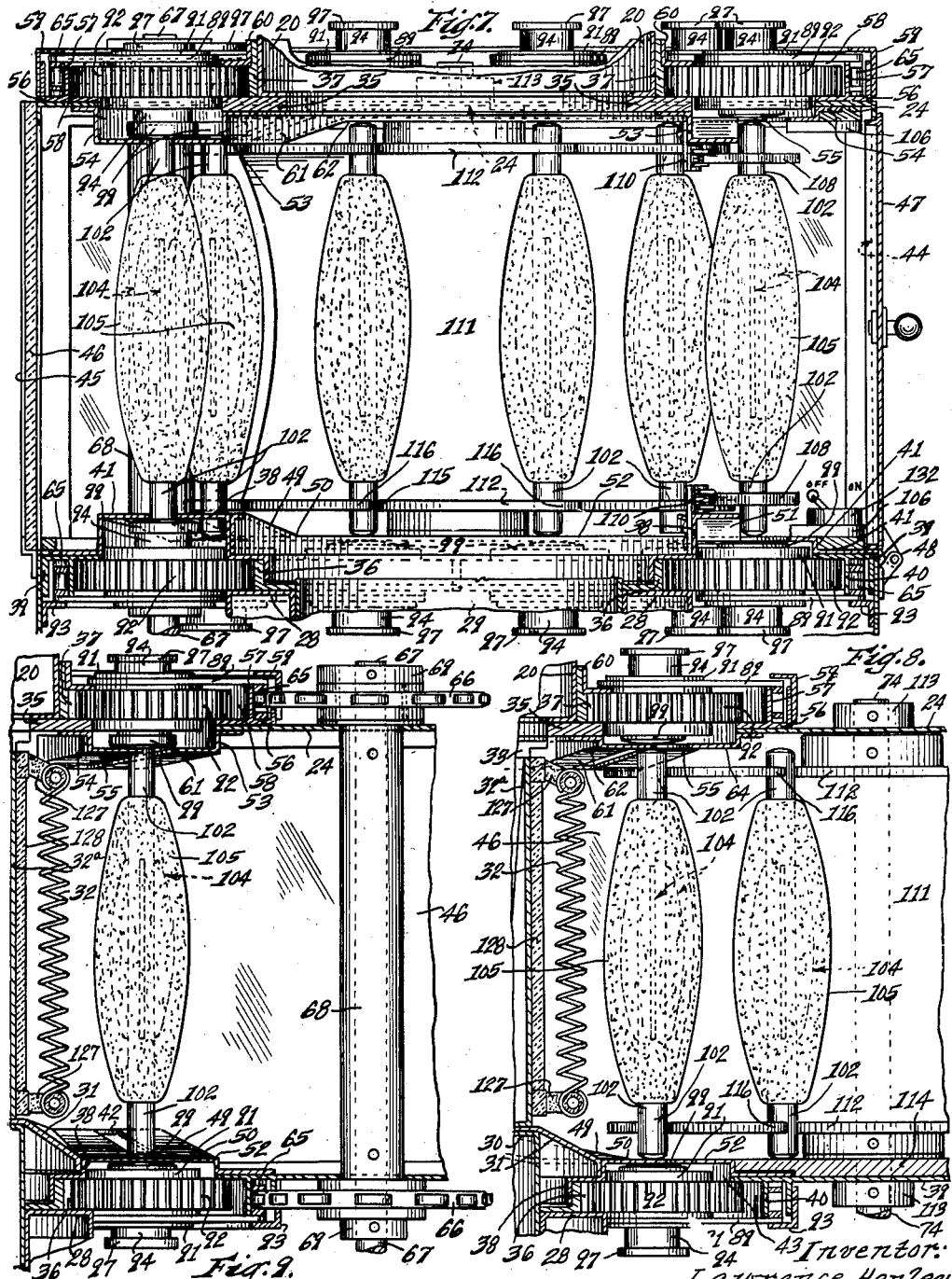
Inventor:
Lawrence Henley,
By Joshua R H Potts
his Attorney.
Witnesses:
E. E. Wessels
Aasta E. Nilsen

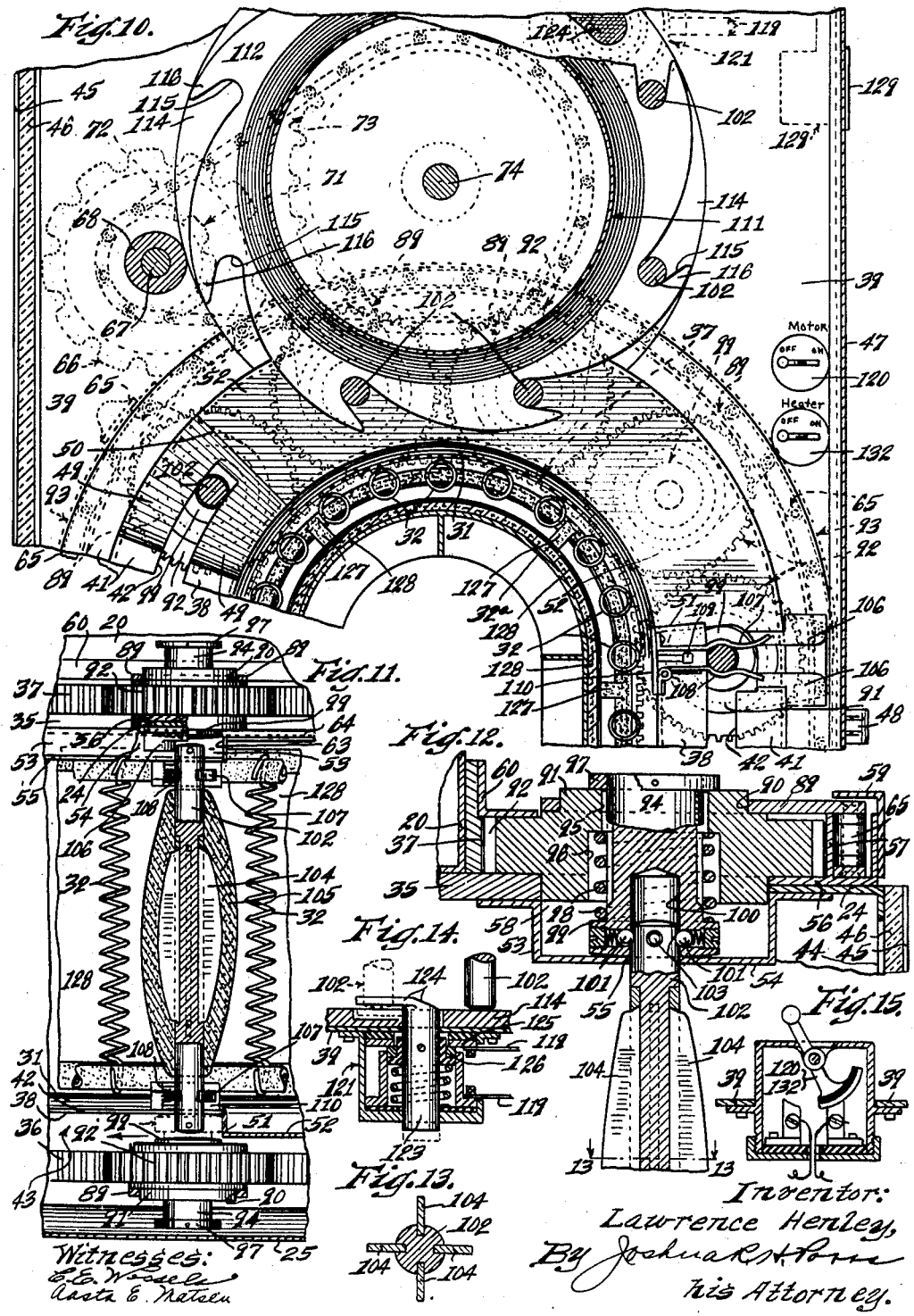

Patented Nov. 2, 1943

2,333,175

UNITED STATES PATENT OFFICE 2,333,175

CONTINUOUS COOKER

Lawrence Henley, Chicago, Ill.

Application February 24, 1941, Serial No. 380,390

17 Claims. (Cl. 53—5)

This invention relates to a new article of food and to a novel apparatus or continuous broiler for the same.

An object of the invention is to produce a new article of food in which the meat is formed in elongated oval shape of circular cross-section or in oppositely tapered round mass or loaf for insertion between the halves of a long roll and to provide an apparatus or continuous broiler with means whereby the meat is held in juxtaposition to a heating element and continuously turned as they are moved in an endless path or orbit around the heating element for broiling or cooking the same during a required period of time between the placing and removal thereof.

Another object of the invention is to provide an apparatus or equipment which is a self-contained unit or fixture in which the prepared meat or food in finely ground form is mounted upon skewers or spindles upon which the same are formed or shaped in elongated oppositely tapered form so as to be conveniently mounted in position on an endless carrier in a vertical or horizontal position and moved about a continuous heating element so as to cook the food while passing about said heating element and to simultaneously revolve or turn the same to expose all portions of the food, preferably double or finely ground beef or otherwise, while being moved around the heating element in an orbital or planetary path so as to thoroughly cook the same without the necessity of using butter or other forms of grease ordinarily used in frying and permitting the excess juices to thoroughly pass through the food or meat and produce a much more edible and more easily digestible food product in form to be applied between the halves of a long roll which can be more conveniently handled and eaten.

Another object of the invention is to provide a continuous broiler which embodies a fixture in which the broiling is done and which is protected on all sides from exposure to unsanitary conditions, dust or dirt and which is supported in convenient position for access upon a base and provided with means for conveniently inserting the spindles or skewers with the meat mass formed thereon to be moved about the heater and for removing the same from the machine after completing the path of travel around the heater or burner completely and properly cooked for placing between the halves of a long roll and to provide means thereabove in the form of a heating cabinet receiving heat from the aforesaid heater for storage of the cooked food and maintain the same in a clean and sanitary condition until sold for consumption.

Another object of the invention is to provide novel spindles or skewers for forming or holding the meat or other food thereon for convenient insertion and removal for cooking and after being cooked by a broiling process and for mounting the same not only to be moved in a continuous and endless path around the broiler heating element but also to be continuously turned to expose all sides of the food toward the heater to insure proper cooking thereof and to automatically remove the same from the machine, as well as to provide means for effectively stopping the action of the machine manually or automatically and turning off the heater especially in the event that the skewers with the meat thereon properly broiled have not been removed from the take-off device and the apparatus is filled to capacity, so as to prevent jamming or injury to the machine and destruction of the food.

Another object of the invention is to provide novel means for conveniently placing the skewers or spindles in position with the food thereon to be carried around in the machine and for automatically releasing the same at the end of the path of movement when the broiling operation is completed and also means for carrying off juices draining from the food during the cooking operation.

Another object of the invention is to provide a continuous broiler which is entirely closed except for an opening through which the spindles or skewers with the meat thereon may be inserted or removed and to provide an apparatus for efficiently handling a large volume economically.

Further objects and advantages will appear and be brought out more fully in the following specification, reference being had to the accompanying drawings, in which:

Fig. 1 is a front or side elevation of a continuous broiler and showing the same in position during the broiling operation;

Fig. 2 is a wiring diagram for electrically controlling the operation of a motor for driving the apparatus or machine constituting a broiler;

Fig. 3 is a wiring diagram of the heating or broiling element and switch for controlling the same;

Fig. 4 is a horizontal plan section taken on the line 4—4 of Fig. 1;

Fig. 5 is a similar view taken on the line 5—5 of Fig. 1;

Fig. 7 is a similar view taken on the line 7—7 of Fig. 1 with the heating element omitted;

Fig. 8 is a similar view taken on the line 8—8 of Fig. 4;

Fig. 9 is a similar view taken on the line 9—9 of Fig. 4;

Fig. 10 is a horizontal plan section taken on the line 10—10 of Fig. 1;

Fig. 11 is a vertical section taken on the line 11—11 of Fig. 10;

Fig. 12 is an enlarged vertical section of one of the spindle or skewer holding means;

Fig. 13 is a section of a spindle taken on the line 13—13 of Fig. 12;

Fig. 14 is a section of a circuit breaker; and

Fig. 15 is a section of a switch for controlling the motor for driving the mechanism of the broiler.

Figure 6:
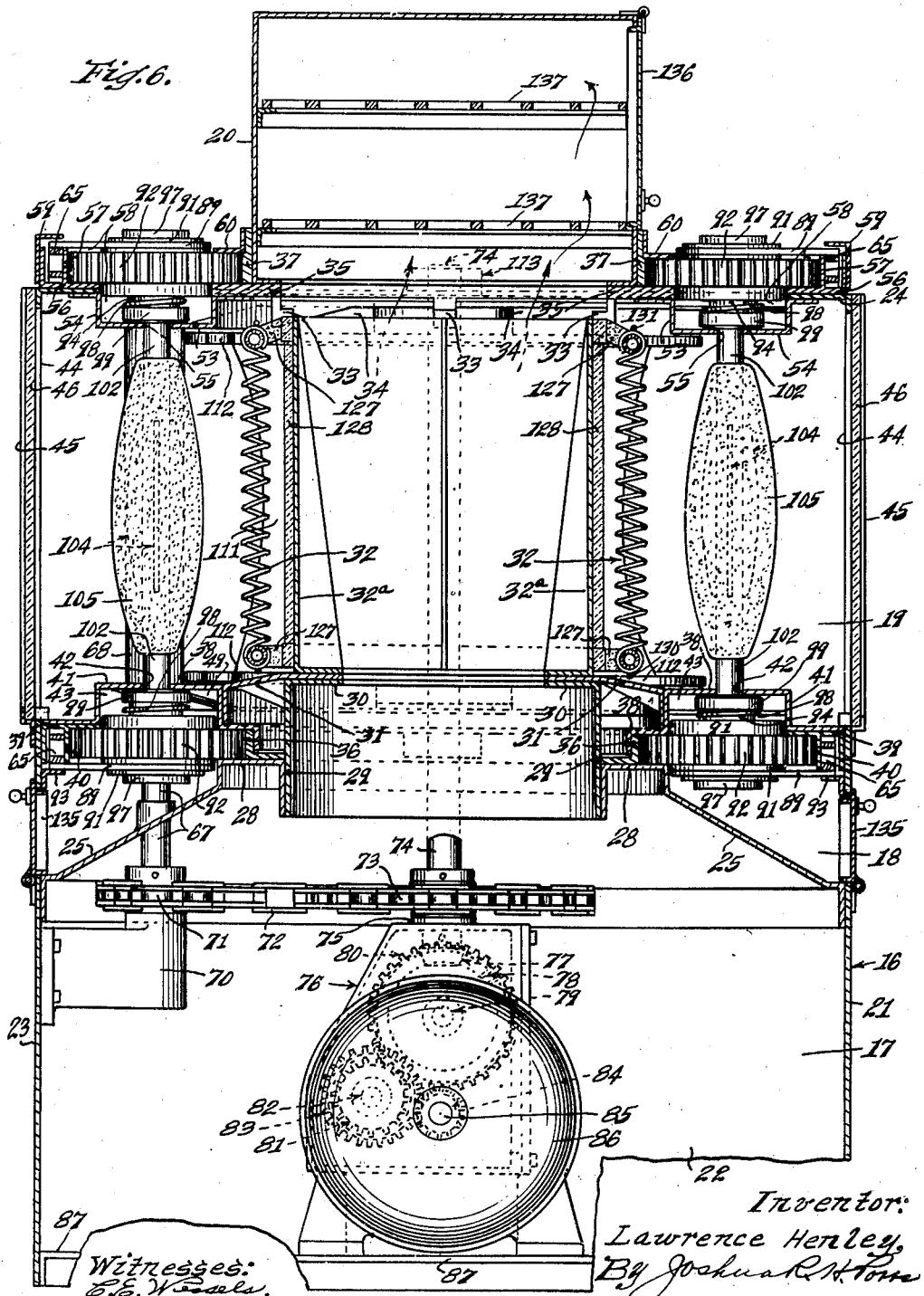
Fig. 6 is an enlarged transverse vertical section taken on the line 6—6 of Fig. 1.

Referring to the drawings in detail, the broiler, apparatus or machine includes a cabinet 16 of rectangular or other suitable outline having a bottom portion or chamber 17, a clean-out chamber 18 and a broiler chamber 19 above which is disposed a heating cabinet or warming oven 20 preferably positioned above the heating element to be hereinafter more fully described. The bottom portion or chamber which is in the form of a cabinet or shell has a front wall 21, ends 22 and a rear wall 23 and the top 24 thereof has an oval opening, although this opening may be of circular or other shape. Also, while I have shown the machine mounted so that the food is arranged vertically to pass horizontally around a broiler or heating element, it is to be understood that the same may be arranged or turned horizontally with equal or greater facility so long as the formed articles of food are supported and passed around the heating element in an endless or continuous path either of oval or circular outline or other orbital path and by a planetary action or otherwise, each article of food continuously revolved or turned in passing about the heating element to expose all portions of the food to the broiling action of the heating element. Above the bottom chamber 17 a suitably inclined wall or drain 25 may be provided for carrying off juices or particles of food which may drop during the operation and which may pass through a drain 26 into a bucket or other container 27 suitably positioned or mounted in one end of the bottom chamber or compartment and rendered accessible as will be described later. While as previously described, I have shown the apparatus of oval outline, it is to be understood that any continuous or circular path may be described and that the same is comprehended within the spirit of the invention. As shown, a channel 28 is provided around an opening in the top of the bottom chamber or compartment 17 providing an opening in the center and having a continuous form with an inner depending portion for supporting a vertical wall 29 with an inturned top flange 30 over which is positioned a plate 31 inclined downwardly in an outward direction for drain purposes of cleaning. Heating elements 32, preferably in the form of an electric broiler, although other suitable forms of burners may be employed, are positioned above the plate 31 so as to terminate short of the annular top portion 24. The heating elements are arranged in annular form outwardly of a vertical metallic or other shell 32a having a bottom flange supported on the plate 31 over the flange 30 or otherwise and suitably ribbed or braced at the inside in the manner of a frame work with suitable supporting arms and insulation. The top of the wall is provided with brackets 33 providing a space 34 above the wall 32a through which heat from the heating elements may pass between the top of the wall and an annular or oval ring 35 mounted on the brackets and supporting the heating cabinet or warming oven 20. It is to be understood that the heating cabinet may cover any desired area although shown supported upon the ring 35 over a central opening therein and the heating element or broiler so that the heat will pass thereinto. An angular lower rack 36 with external teeth is supported upon the channel 28 and an upper rack 37 is mounted upon the annular member 35. An angular guide 38 which is also of annular form is supported over the top of the rack 36 and an angular flange 39 is mounted against the walls of the chamber 17 to extend inwardly and produce an oval opening in the center in the same plane as the guide 38 and concentric thereto while the guide 38 is conjunction with an angular top plate 41 supported on the flange 39 forms an inverted channel having a continuous annular or oval slot 42 with a T-shaped guideway 43 therebeneath.

The walls 21, 22 and 23 support a frame 44 having panels 45 preferably in the form of a glass wall part of which 46 is in the form of a removable panel or door slidably mounted and removable vertically at the top. Over a door opening 47 preferably disposed near one end of the broiler chamber 19 is a hinged panel 48 of glass or otherwise constituting a door, the same being preferably hinged at the bottom to swing down out of the way when the broiler or apparatus is in use for obtaining access for inserting and removing the broiled food. The bottom track produced by the annular angular members or guides 38 and 41 is inclined downwardly as shown at 49 adjacent the back and curved end portion of the track way and at a corresponding position terminates at the point 50 while the front end is maintained in the same plane and terminates at the point 51 with an intervening or interposed horizontal plate 52 at the same level as the base of the inclined portion closed, that is, not provided with the slot 42 but spaced in a plane below the end 51. An angular flange 53 is secured to the annular supporting ring 35 and a corresponding angular flange 54 is secured to the top ring 24 forming a slot 55, said parts depending below the top rings 24 and 35 and producing a channel or track way continuously around the heating element of the broiler. A horizontal flange 56 with a vertical portion 57 forms an endless track way on the ring 24 for a suitable drive member or chain to be later described, the same as in connection with the walls of the chamber 17 and the ring or angular plate 41 at the bottom. The portions 37, 53, 54 and 57 also form a T-shaped guideway 58 having a rim 59 so as to cover the top of the track way outwardly of said guideway. An inner ring 60 of angular cross section is secured in position to close the inner portion of the track way over the rack 37. The construction producing the guideways, track ways and slots are similarly formed at the top and bottom but in opposed or reversed positions. An inclined portion 61 extends beyond the inclined portion 49 or is positioned in advance thereof so that a releasing action to be hereinafter described will take place at the bottom prior to a releasing action at the top for the spindle or skewer holding means to be later described. The track way at the top terminates at the point 62 beyond but corresponding to the end 50 at the bottom and a similar end portion 63 corresponds to the end 51 except that there is provided an intervening or interposed raised part or horizontal wall 64 corresponding to the horizontal plate 52 at the bottom but with a continuation of the slot 55 to free the ends of the spindles or skewers at the top as will be later described. Endless drive members or chains 65 are disposed in the tracks to travel around the walls 40 and 57 and in the narrow channels produced between the same and the outer walls of the cabinet. Both the upper and lower chains are driven by means of sprockets 66 engaging the links of the chains near one end and back portion above the top wall 24 and below the flange 39 in the bottom. These sprockets are carried on a vertical shaft 67 journaled in a bearing sleeve 68 between said walls and held by upper and lower collars 69. The shaft is journaled in a bearing 70 at the bottom and carries a sprocket 71 on the lower end around which a chain 72 is trained to engage a sprocket 73 on a suitably driven short vertical shaft 74 which is adapted to be driven from a motor at reduced speed. This shaft is shown journaled in a bearing 75 of a gear reduction casing 76 and bears a beveled pinion 77 meshing with a beveled gear 78 on a horizontal counter shaft 79 and bearing a spur gear 80 meshing with a pinion 81 on a stud shaft 82. This stud shaft carries a gear 83 which meshes with a gear 84 on a motor shaft 85 of a motor 86 shown in the form of an electric motor so that the shaft 74 is driven at a reduced speed. In the form shown, the speed of the shaft 74 is one-twelfth of that of the motor. The chains or endless drive members 65 carry at suitably spaced intervals inwardly extending arms 89 with bearing rings 90 at their inner ends in which hubs 91 turn. These hubs or bearing sleeves 91 are formed as flanges extending from gears 92 which are positioned to roll or travel around the racks 36 and 37 in a continuous annular path or orbit in the manner of a planetary gear. Thus, while the chains are moved in the tracks at the top and bottom and thus cause rotation of the gears as they roll around the racks, the lower chains are supported by a ring 93 beneath the lower track, the top of the lower track at the ring 41 being closed. A plunger 94 is adapted to move axially in each hub and constitutes part of means for holding the spindles or skewers with the meat or other food thereon. These plungers are splined as at 95 to turn with the gears 92 and the hubs of the latter are provided with counter bores 96 while a collar 97 on the outer end of each plunger engages the hub to keep the plunger from dropping out of position at the top or moving out of position upwardly at the bottom under the action of springs 98 which are disposed between the shoulder of the counter bore 96 and an enlargement or flange 99 extending outwardly from the opposite ends of the plungers and so that the springs acting thereon will normally tend to force the plungers in opposite directions up and down toward each other. These plungers are preferably beveled at the inside as shown in somewhat rounded or convex formation and have sockets 100 with flared mouth portions to facilitate or guide the ends of the spindles therein or the hubs over the ends of the spindles. Spring pressed gripping members or detents 101 in the form of spring pressed balls which are adjustable are provided in the plungers 94 to engage the ends of spindles, pins or skewers 102 which are provided with depressions 103 correspondingly located for this purpose. These spindles or skewers are preferably in the form of circular metal rods with means, preferably in the form of peripheral projections or radial wings 104 keyed or sweated in grooves therein or otherwise suitably formed at equidistantly spaced points and tapering toward their opposite ends so as to hold the meat 105 thereon. Of course, it is to be understood that any form of ground food but preferably beef in finely or doubly ground form mixed with suitable material to cause the same to better adhere to the spindles, may be employed and compressed in a mass thereon or in a suitable mold in proper shape but preferably of oppositely tapered oval form of circular cross section, thus producing a new article of food especially designed for insertion between the halves of a long roll which will facilitate in holding and eating the same.

As before stated, the door opening at 47 is provided for inserting and removing the spindles with the fresh uncooked meat thereon and after the same have been broiled. In order to facilitate insertion and insure proper alignment of the ends of the spindles with the sockets 100 of the plungers 94, grooved guide shoes 106 may be provided at the top and bottom of the broiling chamber at the front to guide the ends of the spindles between spring holders consisting of spring arms 107 with which cooperate hinged or pivoted spring arms 108 which may fold down in the direction of travel of the spindles with the chains so as to release the spindles when engaged in the sockets of the plungers by release of the latter at the proper time and simultaneously in passing the ends 51 and 63 of the tracks which will permit the inner ends of the hubs to ride off of the same and move inwardly in opposite directions under the action of the springs 98 limited by engagement of the collars 97 with the hubs 91. At this time the balls or detents 101 will engage the depressions 103 and cause the spindles to be held and turned with the gears 66 as the latter turn or revolve about their axes and roll on the racks 36 and 37. A stop 109 is provided between the spring arms 107 and 108 to limit the return movement of the pivoted arm 108 toward the arm 107 while permitting the same to swing forwardly at right angles to release the spindles. These parts are mounted upon a plate or bracket 110 upon the rings 38 and 53.

The take-off device to automatically remove the spindles and broiled food from the endless carrier which moves them around the broiler includes a concaved receiving drum 111, the concaved lateral wall being made to pass convex formation of the food 105. This drum is mounted on the shaft 74 and has top and bottom flanges or heads 112 spaced apart so as to grip the ends of the spindles beyond the meat thereon within the track ways. These heads are also fixed to the upper and lower portions of the shaft 74 which is mounted at its upper and lower ends through the walls 34 and 39. A supporting plate 114 is provided at the bottom and has an arcuate recess in one edge to fit against the lower track at the T-shaped track way and to support the spindles at their lower ends when removed from the sockets of the plungers. The heads 112 are provided with curved notches 115 having hook portions 116 which engage and remove the spindles so that the spindles will pass into the crotches of the notches.

As previously described, the motor 86 is preferably an electric motor and the heating elements of the broiler are also preferably resistance wires or coils. The cabinet is provided with a socket 117 corresponding to an ordinary wall socket from which conductors 118 and 119 extend with an interposed switch 120 for manual control of the circuit to the motor 86 and a circuit breaker 121 which is automatically operated by the spindles to break the circuit to the motor and stop the machine in the event that the spindles should not be removed from the take-off device to prevent jamming and injury. Current is supplied by an extension cord 122 which is plugged into the sock 117. The circuit breaker 121 includes a spring held plunger 123 having a cam 124 mounted upon the plate 39 and having a stationary contact 125, and a movable contact 126 carried by the plunger 123 so that when the plunger is depressed by engagement with the lower end of a spindle, the contact 126 is moved out of engagement with the contact 125 to break the circuit. Removal of the spindle will, of course, permit the circuit to be normally closed by engagement of the contacts. Arms 127 are provided at the top and bottom of the frame supporting the plate 32a arranged to carry the conductors for the heating elements and an asbestos or other insulation sheet 128 is provided against the wall 32a to insure that most of the heat will be radiated outwardly for broiling the meat on the spindles. A socket 129 is also provided on the cabinet for connection with lower and upper conductors 130 and 131 with an interposed switch 132 to control the circuit connected to the heating elements and current may be derived from an extension cord 133 which is plugged into the socket 129. A removable panel or door 134 is provided for the bottom chamber 17 for obtaining access to the bucket 27. Hinged clean-out doors 135 are provided in the chamber 18 and hinged doors 136 may be provided for the heating cabinet or warming oven 20 or omitted if desired. This warming oven or heating cabinet is provided with racks or shelves 137 permitting the passage of heat while adapted to support the meat or other food which are thereby maintained in a heated, edible and sanitary condition.

In the operation of the apparatus or machine constituting the continuous broiler as described, the meat or other food is applied to the spindles and retained by the wings thereof in suitable oppositely tapered or cylindrical form as shown. These spindles are then passed into the grooved guides 106 while the machine is operating. In the arrangement shown, the take-off drum will rotate approximately three times for each eight revolutions of the sprocket wheels 66 and each complete operation of the endless carrier but any other suitably proportionate driving arrangement may be employed. By passing the spindles into the guide shoes 106 they are engaged with the spring arms or holding clips 107 and 108. Previously, the plungers 94 have been moved outwardly, that is, the upper plunger upwardly and the lower plunger downwardly to separate them a distance greater than the length of a spindle, the lower plunger being moved downwardly immediately prior to the upward movement of the upper plunger by passing down the inclined surface or end 49. The upper plunger is then disengaged by moving along the inclined surface 61, the purpose of this being to support the spindles until they have been engaged in the notches 115 and moved over the plate 114 out of the continuous path traveled by the gears 92. The plungers are held in this position so as to release the spindles by the horizontal outwardly pressed plate portions 52 and 64 at the curved end of the track until said plungers ride off of the end portions adjacent the position at which the spindles are held by the spring clamps. The plungers are thus simultaneously released so that the springs 93 will move the plungers inwardly toward each other in opposite directions, the upper plungers moving downwardly and the lower plungers moving upwardly so that the socketed ends thereof will engage over the ends of the spindles so as to be in a position to move along with the chains and gears of the endless carrier by collapsing the arm 108 in the advancing direction. The spindles will then be carried along around the broiler or heating element to cook the food or meat thereon and simultaneously revolved by engagement of the gears with the racks as they are moved with the chains so as to present all sides of the food to the broiler burners or heating elements to thoroughly broil or cook the same in a highly digestible form as distinguished from frying in grease. The drippings will pass down over the walls beneath and may be caught in the bucket 27 and removed at required intervals. Should the spindles not be removed from the take-off device, the engagement of the lower end of the spindle 102 with the cam 124 will cause the contacts 125 and 126 to be separated by depression of the plunger 123 against its spring to separate the contact 126 from the contact 125 and thereby break the circuit to the motor 86 so that the machine will immediately stop until the spindles and food thereon have been removed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a continuous broiler, spindles having peripherally projecting means to support an elongated mass of food to be cooked and means for gripping and holding said spindles at their opposite ends in rectilinear positions, means for moving said spindles in a circuitous path about a heating element, means for removing the spindles at a certain point, means for releasing the gripping and holding means prior to reaching said point and means to support the spindles after release for removal by the removing means.

2. A continuous broiler or the like including an endless carrier, said carrier provided with means for gripping the ends of spindles upon which masses of meat have been mounted and having means for turning the same as moved about a heating element and means for automatically removing the spindles.

3. A continuous broiler including an endless carrier having upper and lower spindle receiving members, vertical food carrying spindles engaged at their ends by said members, means for removing the spindles in vertical positions at a certain point in relation to the carrier and means for revolving the spindles as they are moved in an annular path about a burner.

4. A continuous broiler including an endless carrier having upper and lower spindle receiving members, food carrying single spindles engaged at their ends by said members, means to cause the spindles to revolve when moved in a continuous path with the carrier, a heating element within the carrier and exposed toward the spindles, means for removing the spindles from the carrier and means for stopping the carrier upon failure to remove a spindle from the last named means.

5. A continuous broiler including an endless carrier having upper and lower spindle receiving members, food carrying spindles in vertical positions engaged at their ends by said members, means to cause the spindles to revolve when moved in a continuous path with the carrier, a heating element within the carrier and exposed toward the spindles, means for guiding the spindles vertically into position to be engaged and means for releasing the spindles for vertical removal from the carrier.

6. A continuous broiling device including a cabinet, an endless heater therein, an endless carrier for movement around the heater, means for driving the carrier, means for vertically supporting spindles in the carrier with food thereon and means for automatically removing the spindles and maintaining the same in such position.

7. A broiler of the class described including a cabinet having a heating element of annular form, a carrier including endless members spaced apart and movable about the heater in an orbital path, means carried by said endless members for removably gripping the upper and lower ends of spindles in vertical positions and having meat compressed about the same intermediately in elongated formation, means for actuating said carrier, a take-off device for removing the spindles from the carrier at a certain point in its path of travel and means to release the gripping means for engagement by the take-off device.

8. A continuous broiler including horizontally movable parallel spaced upper and lower endless carriers, an upright heater around which said carriers are movable, gripping members carried by said carriers, spindles gripped at their upper and lower ends by said members and having wings to hold ground food thereon in a compressed mass tapering in opposite directions, means for successively releasing the upper and lower gripping members, a take-off device for removing the spindles from the carriers and means for supporting the spindles when said members are released and until removed from the take-off device and means for controlling the operation of said carriers.

9. A continuous broiler including spaced upper and lower carriers, a heater around which said carriers are movable, opposed gripping members carried by said carriers, spindles comprising rods having wings to hold ground food thereon in a compressed mass tapering in opposite directions, means for positioning said spindles, means to cause automatic engagement of the gripping members with the ends of the spindles in vertical positions and means for automatically releasing and removing the spindles.

10. A continuous broiler including an oval shaped heating element, an endless carrier movable horizontally around said element, means for gripping the ends of vertical spindles in said carrier, means for vertically centering the spindles to be gripped, means for releasing the spindles and means for removing the spindles vertically from said carrier.

11. A continuous broiler including an oval shaped heating element, an endless carrier movable around said element, means for gripping the upper and lower ends of spindles in said carrier, means for centering and feeding the spindles in vertical positions to be gripped, means for releasing the spindles and a take-off device to automatically remove the spindles from the carrier in said positions.

12. A continuous broiler of the class described comprising an annular heating element, an endless drive member movable horizontally around the heating element, said endless drive member having vertical spindle holding means, said spindles adapted to carry an elongated mass of ground food thereon, means to mount and automatically engage the spindles at a certain position of the endless drive member, means to automatically release the spindles at another point and means to simultaneously engage and remove the spindles from the endless drive member at the latter point.

13. A continuous broiler of the class described comprising an annular heating element, an endless drive member movable around the heating element, said endless drive member having spindle holding means, said spindles adapted to carry an elongated mass of ground food thereon, means to automatically engage the spindles at a certain position of the endless drive member, means to automatically release the spindles at another point, means to simultaneously remove the spindles from the endless drive member at the latter point and means to automatically stop the operation of the endless drive member upon failure to remove the spindles from the removing means.

14. A continuous broiler including a cabinet having an enlclosed heating element, upper and lower drive members movable in a path about the heating element and having members adapted to turn during such movement, said members having means to grip the ends of spindles on which masses of vertical ground food are intermediately formed and held to be moved about said heating element and rotated, means to automatically engage the spindles on the drive members and rotatable means for engaging and removing said spindles from said members.

15. A continuous broiler including a cabinet having an enclosed heating element, upper and lower drive members movable in a path about the heating element and having members adapted to turn during such movement, said members having means to grip the ends of spindles on which masses of ground food are intermediately formed and held to be moved about said heating element and rotated, means for separating said gripping means at a certain point to permit removal of the spindles and hold them separated until another point is reached and means at the latter point for releasing the gripping means to engage the ends of the spindles inserted at such point.

16. A continuous broiler including a cabinet having an enclosed heating element, upper and lower drive members movable in a path about the heating element and having members adapted to turn during such movement, said members having means to grip the ends of spindles on which masses of ground food are intermediately formed and held to be moved about said heating element and rotated, means for separating said gripping means at a certain point to permit removal of the spindles and hold them separated until another point is reached, means at the latter point for causing the gripping means to engage the ends of the spindles inserted at such point and means for centering the spindles to be gripped.

17. A continuous broiler including a cabinet having an enclosed heating element, upper and lower drive members movable in a path about the heating element and having members adapted to turn during such movement, said members having means to grip the ends of spindles on which masses of ground food are intermediately formed and held to be moved about said heating element and rotated, means for separating said gripping means at a certain point to permit removal of the spindles and hold them separated until another point is reached, means at the latter point for releasing the gripping means to engage the ends of the spindles inserted at such point, means for centering the spindles to be gripped and means for successively removing the spindles upon approach to the point of release thereof by the gripping means.

LAWRENCE HENLEY.